(12) United States Patent
Yu

(10) Patent No.: US 8,070,123 B2
(45) Date of Patent: Dec. 6, 2011

(54) ADJUSTABLE MOUNTING BRACKET FOR ELECTRONIC DEVICE

(75) Inventor: Chin-Ming Yu, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/846,792

(22) Filed: Jul. 29, 2010

(65) Prior Publication Data

US 2011/0253855 A1 Oct. 20, 2011

(51) Int. Cl.
*A47B 91/00* (2006.01)
(52) U.S. Cl. ............... 248/346.06; 248/349.1; 248/691
(58) Field of Classification Search ............ 248/346.01, 248/346.03, 346.06, 349.1, 303, 304, 305, 248/307, 499, 500, 503, 510, 690, 691, 692, 248/130, 139, 133, 144, 424, 447, 448, 451, 248/458; 24/522, 527; 269/3, 6, 43, 45, 269/131

See application file for complete search history.

(56) References Cited

U.S. PATENT DOCUMENTS

| | | | | |
|---|---|---|---|---|
| 1,473,943 A | * | 11/1923 | Strifler | 224/42.16 |
| 3,229,952 A | * | 1/1966 | Zumbo | 248/499 |
| 4,611,961 A | * | 9/1986 | Van Iperen et al. | 410/20 |
| 5,608,951 A | * | 3/1997 | Chou | 24/302 |
| 7,803,176 B2 | * | 9/2010 | Teague et al. | 606/300 |

* cited by examiner

*Primary Examiner* — A. Joseph Wujciak, III
(74) *Attorney, Agent, or Firm* — Altis Law Group, Inc.

(57) ABSTRACT

A mounting bracket for fixing an electronic device on television set includes a holding portion and a mounting portion. The holding portion includes a holding frame, a rotating frame and a connecting hinge. The mounting portion includes an adjusting strap, a plurality of hook portions, a pair of adjustable buckles, a pair of latch portions, a pair of latching hooks and a pair of adjustable screws. The latching hook can be fixed on the latch portion by inserting the adjusting screw through the round hole and the adjusting slot. The mounting bracket can be mounted on different positions by adjusting a relative position between the holding frame and the rotating frame or by securing the adjusting strap on different position of the buckling portion and by mating the hook portion with the tri-lobed hole.

10 Claims, 6 Drawing Sheets

ADJUSTABLE MOUNTING BRACKET FOR ELECTRONIC DEVICE

BACKGROUND

1. Technical Field

The present disclosure relates to a mounting bracket, and more particularly to an adjustable mounting bracket for attaching an electronic device on a television set under different mounting conditions.

2. Description of Related Art

Generally, it is very difficult to mount an electronic device (such as set-top box, DVD player etc) onto various television sets because of different thickness and structures from different makes and models of the electronic device and/or television sets. Mounting brackets are specifically designed for the electronic device with a specific holder. Therefore, the mounting bracket can only be mounted on the television set at the same position without an adjustable mounting position. If there are blocks protruding out from a backboard of the television set, it is difficult to mount the electronic devices stably due to the uneven structure. To mount the electronic device stably on a television set with blocks using the adjustable mounting position, the mounting bracket must be more universal for television sets with different makes and models.

Therefore, a need exists in the industry to overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
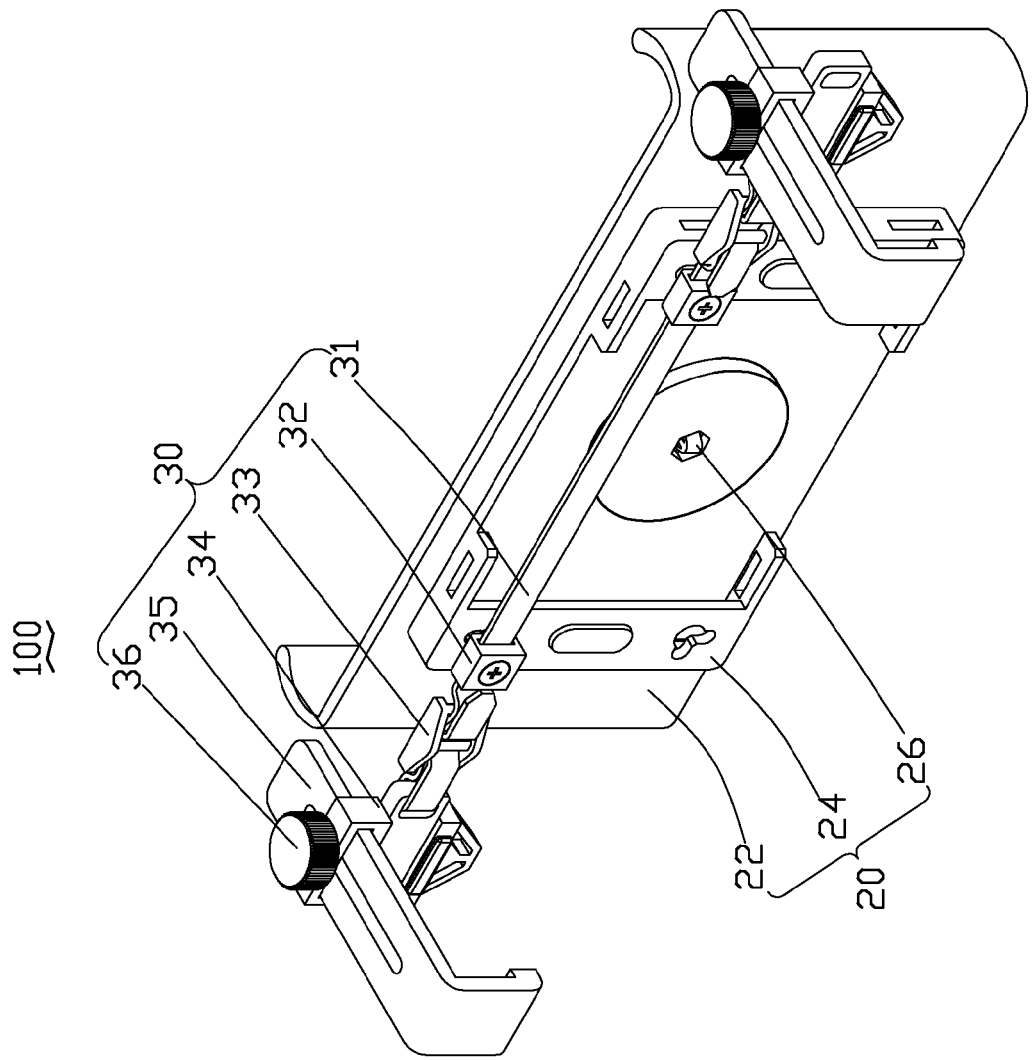
FIG. 1 is an isometric view of a first embodiment of a mounting bracket in accordance with the present disclosure.

FIG. 1 is an isometric view of the first embodiment of a mounting bracket 100 in accordance with the present disclosure. The mounting bracket 100 is used to attach an electronic device onto a television set, and comprises a holding portion 20 and a mounting portion 30. The holding portion 20 comprises a holding frame 22, a rotating frame 24 and a connecting hinge 26. The mounting portion 30 comprises an adjusting strap 31, a plurality of hook portions 32, a pair of adjustable buckles 33, a pair of latch portions 34, a pair of latching hooks 35 and a pair of adjustable screws 36.

Figure 2:
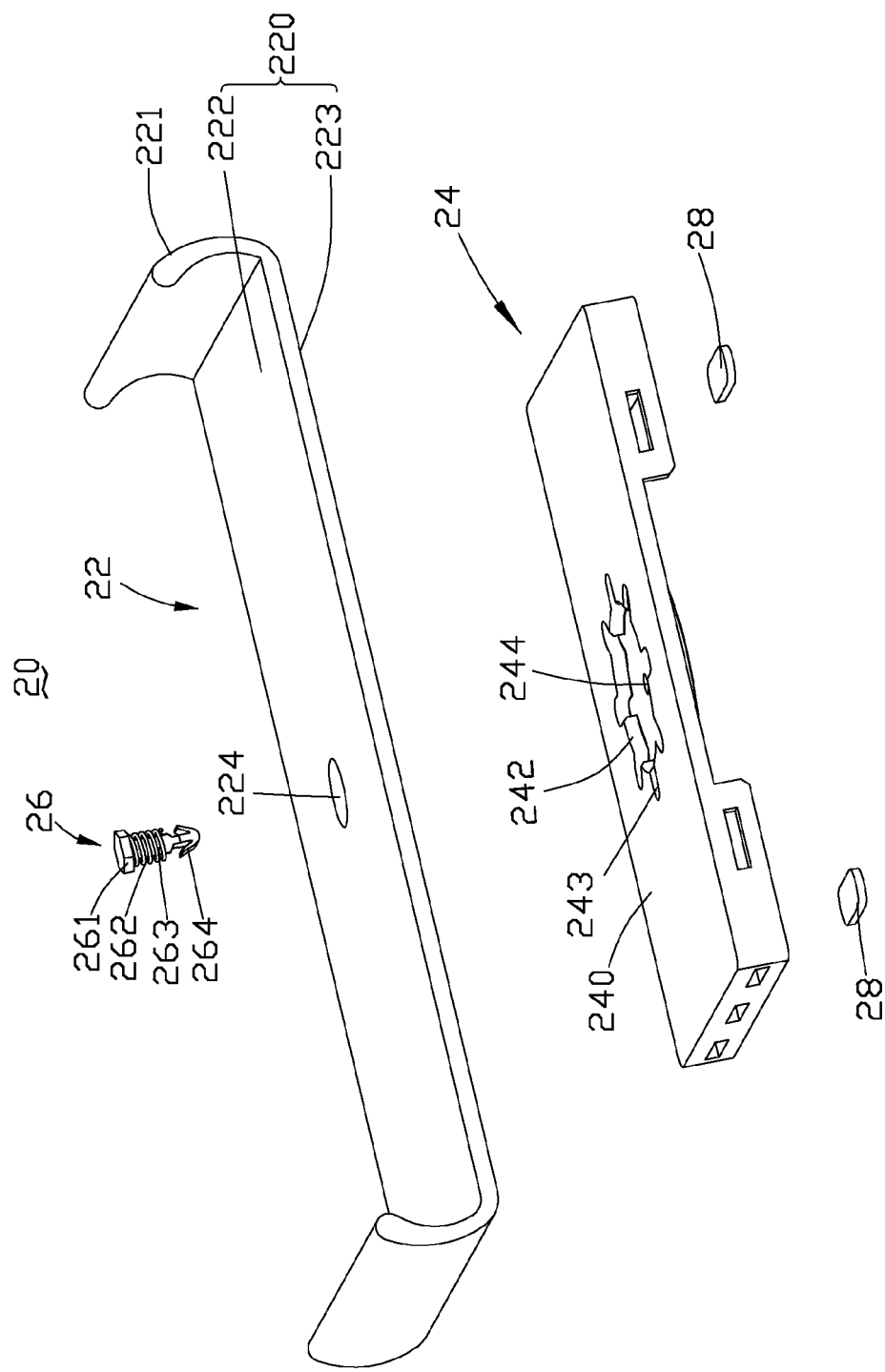
FIG. 2 is a disassembled perspective view showing a holding portion in accordance with the present disclosure.
Figure 3:
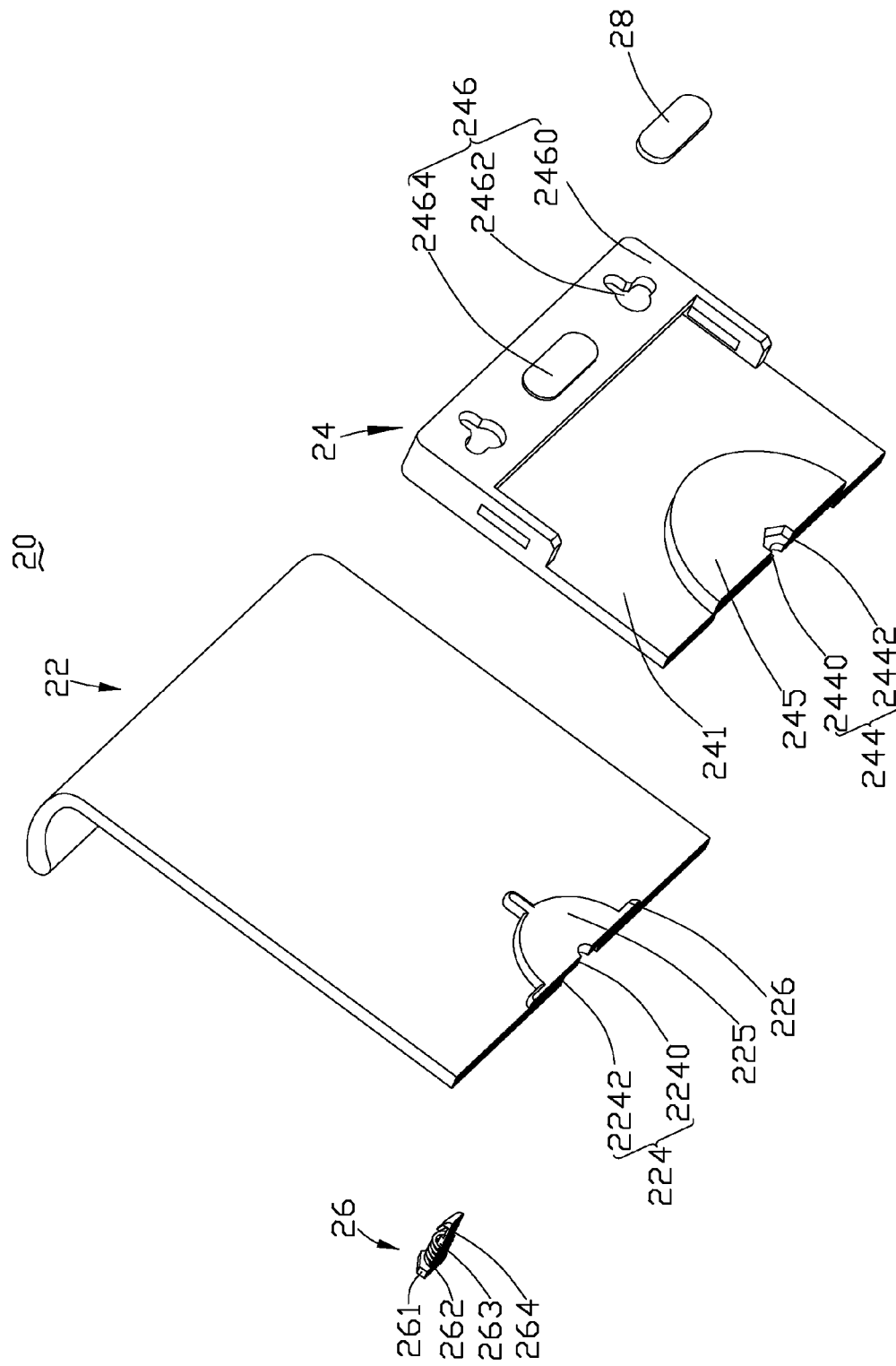
FIG. 3 is another disassembled perspective view showing the holding portion in accordance with the present disclosure.

FIG. 2 and FIG. 3 are disassembled perspective views showing the holding portion 20 in accordance with the present disclosure. The holding frame 22 comprises a holding board 220 and a pair of retaining ends 221 bending from two ends of the holding board 220. In the illustrated embodiment, both the retaining ends 221 and the holding board 220 form a C-shape. The holding board 220 comprises a holding surface 222 and a securing surface 223 on two opposite sides of the holding board 220. A first convex stage 225 protrudes outwardly from the securing surface 223. A plurality of protruding posts 226 extend from the first convex stage 225 and are spaced apart from each other. In the illustrated embodiment, the first convex stage 225 and the plurality of protruding posts 226 are integrally formed with the holding board 220. In the middle of the holding board 220, a first hole 224 passing through the holding board 220 and the first convex stage 225 is defined. The first hole 224 coaxial to the first convex stage 225 comprises a first connecting segment 2240 contiguous with the securing surface 223 and a receiving segment 2242 contiguous with the holding surface 222. In the illustrated embodiment, the diameter of the first connecting segment 2240 is smaller than that of the receiving segment 2242.

The rotating frame 24 comprises a mounting surface 240 to engage with the securing surface 223 of the holding frame 22 and an adjusting surface 241 opposite to the mounting surface 240. The mounting surface 240 defines a receiving groove 242 receiving the first convex stage 225 and a plurality of latching grooves 243 communicating with the receiving groove 242 to engage with the plurality of protruding posts 226. In the illustrated embodiment, the latching grooves 243 are spaced apart from each other.

A second convex stage 245 protrudes out from the adjusting surface 241 and corresponds to the receiving groove 242 to enhance intensity and rigidity of the rotating frame 24. In the middle of the rotating frame 24, a second hole 244 passing through the receiving groove 242 and the second convex stage 245 is defined. The second hole 244 is configured with a second connecting segment 2440 contiguous with the mounting surface 240 and a latching segment 2442 contiguous with the adjusting surface 241. In the illustrated embodiment, the cross section of the second connecting segment 2440 is circular, the cross section of the latching segment 2442 is polygonal, and the diameter of the second connecting segment 2440 is smaller than that of the latching segment 2442. The connecting segment 2440 and the latching segment 2442 are adapted to accommodate the connecting hinge 26.

A pair of securing portions 246 located on two ends of the adjusting surface 241, respectively. Each pair of securing portions 246 comprises a securing arm 2460 spacing from the adjusting surface 241 in parallel. The securing arm 2460 defines a plurality of tri-lobed holes 2462 and at least one first key groove 2464 to receive a first washer 28. The first washer 28 contacts with a television set to decrease vibration and to provide protection against wear to the television set. In the illustrated embodiment, the rotating frame 24 is shaped as a rectangle and the plurality of tri-lobed holes 2462 are configured on four corners of the rotating frame 24.

The connecting hinge 26 passes through the first hole 224 and the second hole 244 to movably fix the holding frame 22 with the rotating frame 24, as the rotating frame 24 can rotate relatively to the holding frame 22. The connecting hinge 26 comprises a head portion 261, an elastic element 262, a shaft segment 263 and a pair of latching clips 264. The head portion 261 is received in the receiving segment 2242 when mounting the holding frame 22 with the rotating frame 24. The shaft segment 263 is configured between the head portion 261 and the pair of latching clips 264. The elastic element 262, herein illustrated as a compression spring, is coiled around the shaft segment 263. The pair of latching clips 264 are symmetrically located on the end of the connecting hinge 26 and received in the latching segment 2442 to mount the holding frame 22 with the rotating frame 24.

When assembling the rotating frame 24 to the holding frame 22, the first convex stage 225 is received in the receiving groove 242 and the plurality of protruding posts 226 are engaged with the plurality of latching grooves 243, correspondingly. A relative position between the holding frame 22 and the rotating frame 24 can be adjusted by selectively mating the plurality of protruding posts 226 with the plurality of latching grooves 243. Then, the connecting hinge 26 passes through the receiving segment 2242, the first connecting segment 2240 and the second connecting segment 2440 to latch with the latching segment 2442. The elastic element 262 is resisted between the head portion 261 of the connecting hinge 26 and the holding frame 22. The head portion 261 and the elastic element 262 are received in the receiving segment 2242. The shaft segment 263 connects the first connecting segment 2240 with the second connecting segment 2440 and the pair of latching clips 264 are securely latched on the latching segment 2442.

Figure 4:
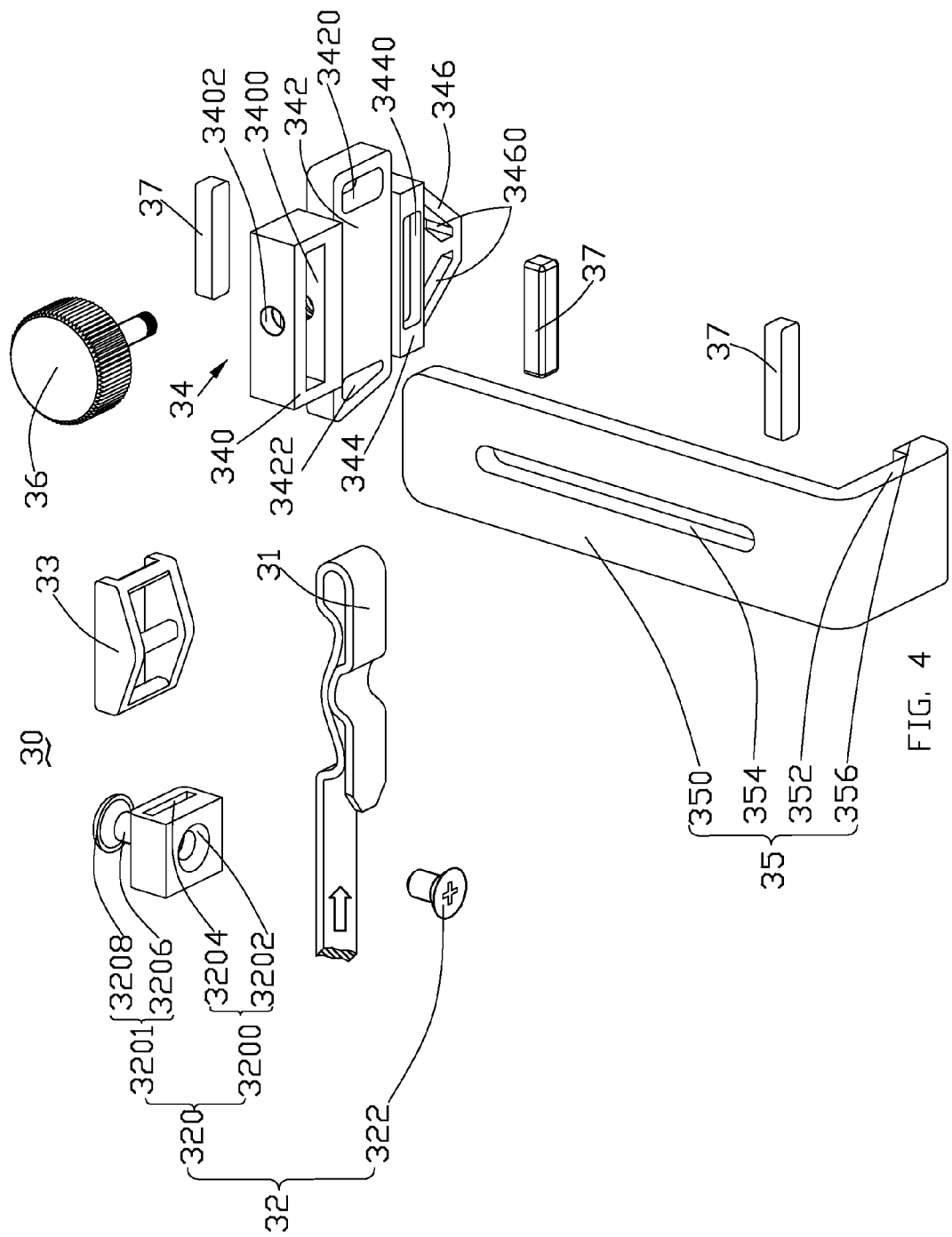
FIG. 4 is a disassembled perspective view showing a mounting portion in accordance with the present disclosure.

FIG. 4 is a disassembled perspective view showing the mounting portion 30 in accordance with the present disclosure. The adjusting strap 31 is made from a flexible material, such as nylon. The adjusting strap 31 is assembled to the hook portions 32. Each of the plurality of hook portions 32 comprises a hook base 320 and a mounting screw 322. The hook base 320 comprises a mounting base 3200 and a connecting hook 3201 protruding out from the mounting base 3200. The mounting base 3200 defines a screw hole 3202 and a strap hole 3204 perpendicularly communicating with the screw hole 3202. The strap hole 3204 is used to receive the adjusting strap 31. The screw hole 3202 and the connecting hook 3201 are located on two opposite sides of the mounting base 3200, respectively. The mounting screw 322 engages with the screw hole 3202 and resists onto the adjusting strap 31 to secure the adjusting strap 31 on the hook portion 32. The hook portion 32 can be adjusted to locate on different position of the adjusting strap 31 by loosening the mounting screw 322 and moving the hook base 320 to an expected position. In the illustrated embodiment, the strap hole 3204 is rectangularly-shaped. The connecting hook 3201 comprises a hook rod 3206 and a connecting head 3208 securely connected with one end of the hook rod 3206. The other end of the hook rod 3206 is fixed to the mounting base 3200. In the illustrated embodiment, the mounting base 3200 is integrally formed with the connecting hook 3201. The connecting head 3208 is hemispherically-shaped to engage with the tri-lobed hole 2462 to mount the mounting portion 30 onto the holding portion 20.

The adjustable buckle 33 engages with the adjusting strap 31 to regulate the length of the adjusting strap 31 according to the width of the holding portion 20. One end of the adjusting strap 31 runs through the adjustable buckle 33 and reversely retraces the adjustable buckle 33 to attach the adjustable buckle 33 on the adjusting strap 31. The length of the adjusting strap 31 can be adjusted to a desired length by loosening the adjusting strap 31 from the adjustable buckle 33. Then the adjustable buckle 33 is mounted on the adjusting strap 31 by tightly pulling the end of the adjusting strap 31.

Each of the pair of latch portions 34 comprises a connecting portion 340, a first buckling portion 342, a stopper portion 344 and a second buckling portion 346. The connecting portion 340 is disposed on the top of the first buckling portion 342, and defines a receiving opening 3400 and a round hole 3402. The receiving opening 3400 perpendicularly communicates with the round hole 3402. In the illustrated embodiment, the receiving opening 3400 is rectangularly-shaped.

The first buckling portion 342 is disposed between the connecting portion 340 and the stopper portion 344, and comprises a first side buckle 3420 and a second side buckle 3422. The first side buckle 3420 and the second side buckle 3422 are located on two sides of the first buckling portion 342. The first side buckle 3420 is twinned with the second side buckle 3422 to allow the adjusting strap 31 to pass through. If two ends of the adjusting strap 31 are inserted through the first side buckle 3420 and the second side buckle 3422 of two latch portions 34 respectively, the two latch portions 34 will be horizontally mounted on the adjusting strap 31. In the illustrated embodiment, the first side buckle 3420 is rectangularly-shaped, and the second side buckle 3422 is triangularly-shaped.

The second buckling portion 346 is disposed under the stopper portion 344 and comprises a pair of third side buckles 3460 to allow the adjusting strap 31 to pass through. In the illustrated embodiment, the pair of third side buckles 3460 collectively form a V-shape. If two ends of the adjusting strap 31 are inserted through the pair of third side buckles 3460 of two latch portions 34, respectively, the two latch portions 34 will be mounted on the adjusting strap 31 at a slant.

In the illustrated embodiment, the axis directions of the first side buckle 3420, the second side buckle 3422 and each of the third side buckles 3460 are the same with that of the receiving opening 3400. The stopper portion 344 is disposed between the first buckling portion 342 and the second buckling portion 346, and defines a pair of opening grooves 3440. The pair of opening grooves 3440 are located on two opposite sides of the stopper portion 344 and have the same axis direction with that of the receiving opening 3400. Each of the pair of opening grooves 3440 is used to receive a second washer 37. The second washer 37 contacts with the television set to decrease vibration and provide protection against wear to the television set.

One end of the adjusting strap 31 passes through the strap hole 3204, the adjustable buckle 33 and the latch portion 34 in turn to fasten the adjusting strap 31 on the adjustable buckle 33 and the latch portion 34 with the expected length. Then the hook portion 32 is mounted on the adjusting strap 31 by tightening the mounting screw 322 at the expected position. Depending on the mounting conditions, the hook portion 32, the adjustable buckle 33 and the latch portion 34 can be adjusted to different positions with use of the adjusting strap 31.

Each of the pair of latching hook 35 is mounted on the television set and comprises an adjusting segment 350, a securing segment 352 with one end perpendicularly bent from the adjusting segment 350 and a securing end 356 perpendicularly bent from the other end of the securing segment 352. In this structure, the adjusting segment 350 and the securing end 356 extend toward the same direction. In the illustrated embodiment, the adjusting segment 350, the securing segment 352 and the securing end 356 collectively form a substantial L-shape. The adjusting segment 350 defines an adjusting slot 354 in a thin rectangular shape. The adjusting segment 350 is received in the receiving opening 3400 to make the adjusting slot 354 communicate with the round hole 3402. The latching hook 35 is assembled to the latch portion 34 by inserting each of the pair of adjustable screws 36 through the round hole 3402 and the adjusting slot 354.

A relative position between the latch portion 34 and the adjusting slot 354 can be adjusted by moving the adjusting segment 350 in the receiving opening 3400 according a thickness of the television set. The second washer 37 is installed on the end of the securing end 356 which is opposite to the second washer 37 received in the opening groove 3440 of the stopper portion 344. The second washer 37 makes contact with the television set to decrease vibration and provide protection against wear to the television set.

Figure 5:
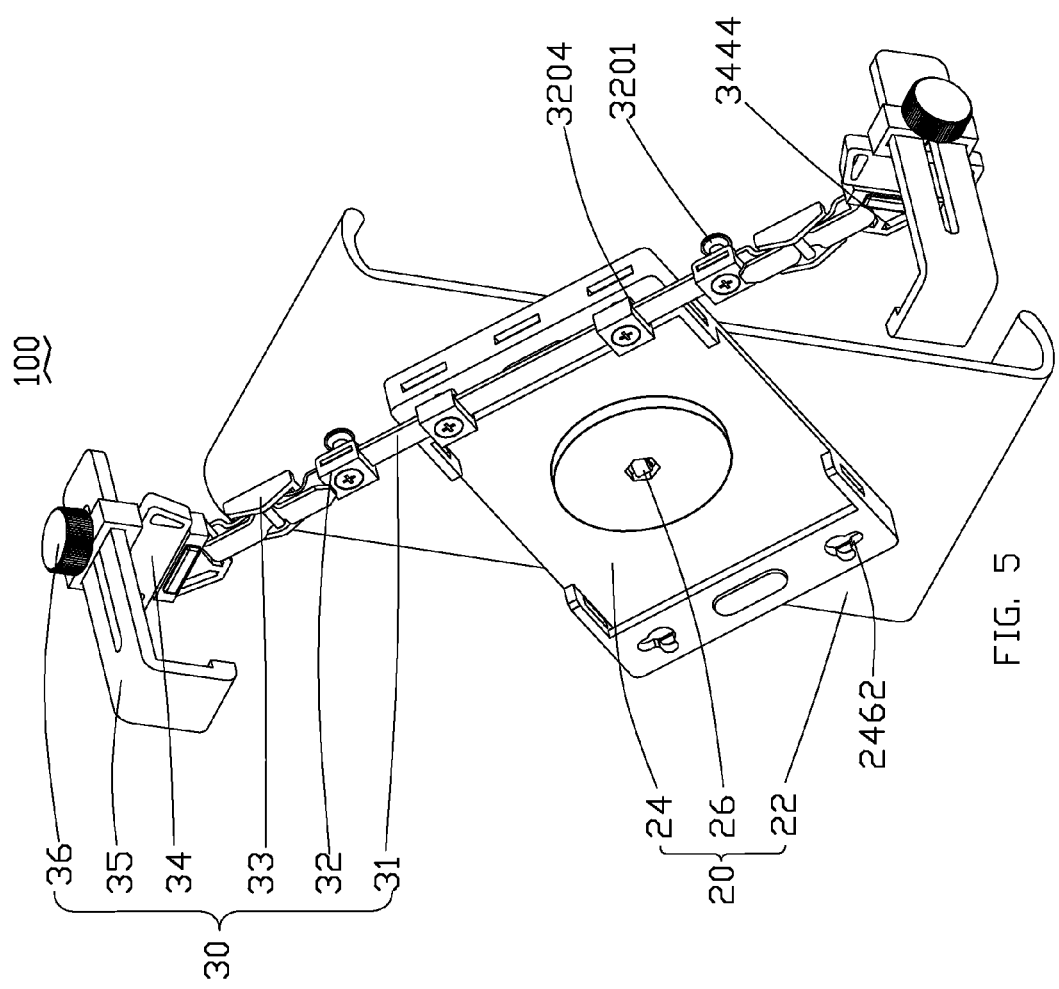
FIG. 5 is an isometric view of a second embodiment of the mounting bracket in accordance with the present disclosure.

In the illustrated embodiment, the mounting bracket 100 is adjustably mounted on different positions by adjusting the relative position between the holding frame 22 and the rotating frame 24 as well as by securing the latch portion 34 on different positions of the adjusting strap 31 and by mating the hook portion 32 with the tri-lobed hole 2462. FIG. 1 and FIG. 5 show two different mounting mechanisms, the users can use to adjust the position of the mounting bracket 100 according to the mounting conditions.

FIG. 1 shows the mounting bracket 100 horizontally mounted on the television set. The first convex stage 225 engages with the receiving groove 242 and the plurality of protruding posts 226 selectively mate with the plurality of latching grooves 243 to install the holding frame 22 on the rotating frame 24 at desired positions. When one end of the adjusting strap 31 passes through the strap hole 3204, the adjustable buckle 33, the first side buckle 3420 or the second side buckle 3422, and the adjustable buckle 33 in order; the adjusting strap 31 is fastened on the adjustable buckle 33 and the latch portion 34 with the expected length and the hook portion 32 is mounted on the adjusting strap 31 by tightening the mounting screw 322 at the expected position. The connecting hook 3201 is received in the corresponding tri-lobed hole 2462 to horizontally mount the mounting portion 30 onto the holding portion 20.

Similarly, FIG. 5 illustrates the mounting bracket 100 mounted on the television set at a slant. The holding frame 22 is pulled out in an axial direction of the connecting hinge 26 to compress the elastic element 262 between the head portion 261 and the receiving segment 2242. The plurality of protruding posts 226 break away from the plurality of latching grooves 243 and they will selectively mate with each other once again by rotating the rotating frame 24 along with the connecting hinge 26, so that the rotating frame 24 is securely mounted on the holding frame 22 at a certain angle. In the illustrated embodiment, the angle is 45 degrees. When one end of the adjusting strap 31 passes through the strap hole 3204, the adjustable buckle 33, one of the pair of the third side buckles 3444, and the adjustable buckle 33 in order, the adjusting strap 31 is fastened on the adjustable buckle 33 and the latch portion 34 with the expected length and the hook portion 32 is mounted on the adjusting strap 31 by tightening the mounting screw 322 at the expected position. The connecting hook 3201 is received in the corresponding tri-lobed hole 2462 to mount the mounting portion 30 onto the holding portion 20 at the slant. In the illustrated embodiment, the angle of the slant is 45 degrees.

Figure 6:
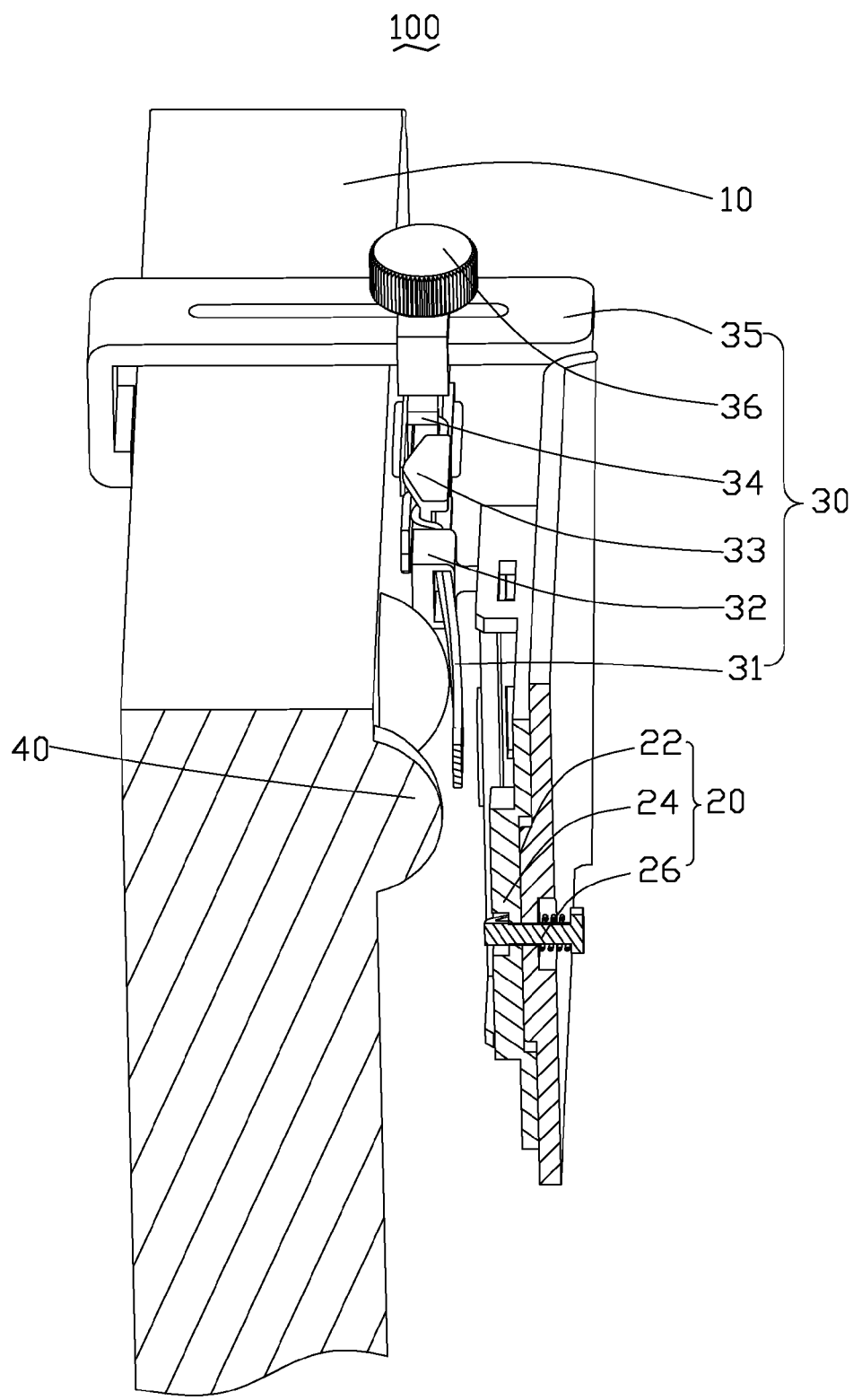
FIG. 6 is a cross-sectional view of a third embodiment of the mounting bracket in accordance with the present disclosure.

FIG. 6 is a cross-sectional view of a third embodiment of the mounting bracket 100 in accordance with the present disclosure. A backboard 10 of the television set defines a plurality of blocks 40 protruding out from the backboard 10. When the mounting bracket 100 is mounted on the backboard 10 of the television set, the adjusting strap 31 can flex across the plurality of blocks 40 and be adjusted by loosening the adjustable buckle 33 or by disassembling the mounting screw 322 from the hook base 320. In this case, the mounting bracket 100 can be stably mounted on the backboard 10 of the television set. In other embodiment, the mounting bracket 100 may be mounted on other electronic devices.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A mounting bracket, comprising:
a holding portion, comprising a holding frame, a rotating frame and a connecting hinge, the rotating frame defining a plurality of tri-lobed holes, the connecting hinge fixing the holding frame with the rotating frame; and
a mounting portion, comprising an adjusting strap, a plurality of hook portions, a pair of latch portions and a pair of latching hooks, each of the plurality of hook portions comprising a hook base to receive the adjusting strap and a connecting hook protruding outwardly from the hook base, each of the latch portions comprising a receiving opening, a first buckling portion and a second buckling portion, the adjusting strap connecting with one of the first buckling portion and the second buckling portion to fasten one end of the adjusting strap on the latch portion, each of the pair of latching hooks comprising an adjusting segment received in the receiving opening and a securing segment perpendicularly bending from the adjusting segment;
wherein the connecting hook is received in the corresponding tri-lobed hole to mount the mounting portion onto the holding portion, the mounting bracket is adjustably mounted on different positions by adjusting a relative position between the holding frame and the rotating frame as well as by securing the latch portion on different position of the adjusting strap and by mating the hook portion with the tri-lobed hole.

2. The mounting bracket as claimed in claim 1, wherein the mounting portion further comprises a pair of adjustable buckles engaging with the adjusting strap to regulate a length of the adjusting strap according to the holding portion.

3. The mounting bracket as claimed in claim 2, wherein the mounting portion further comprises a pair of adjustable screws, each of the latch portions further defines a round hole perpendicularly communicating with the receiving opening, and the adjusting segment of the latching hook defines an adjusting slot, the latching hook assembled to the latch portion by inserting each of the pair of the adjustable screws through the round hole and the adjusting slot.

4. The mounting bracket as claimed in claim 3, wherein the holding frame comprises a first convex stage and a plurality of protruding posts extending from the first convex stage and spaced apart from each other, and the rotating frame defines a receiving groove receiving the first convex stage and a plurality of latching grooves communicating with the receiving groove to engaging with the plurality of protruding posts, a relative position between the holding frame and the rotating frame can be adjusted by selectively mating the plurality of protruding posts with the plurality of latching grooves.

5. The mounting bracket as claimed in claim 4, wherein the receiving groove, the first convex stage and the plurality of protruding posts are integrally formed with the holding frame.

6. The mounting bracket as claimed in claim 5, wherein in the middle of the holding frame, a first hole passing through the holding frame and the first convex stage is defined, the first hole is coaxial to the first convex stage, the rotating frame further comprises a second convex stage opposite to the receiving groove and defines a second hole coaxially passing through the receiving groove and the second convex stage.

7. The mounting bracket as claimed in claim 6, wherein the connecting hinge comprises a head portion, an elastic element, a shaft segment and a pair of latching clips, the elastic element is coiled around the shaft segment and resisted between the head portion and the holding frame, and the pair of latching clips are received in the second hole to mount the holding frame with the rotating frame.

8. The mounting bracket as claimed in claim 7, wherein each of the plurality of hook portions further comprises a plurality of mounting screws, the hook base defines a strap hole to receive the adjusting strap and a screw hole perpendicularly communicating with the strap hole, each of the plurality of the mounting screws engages with the screw hole and resists onto the adjusting strap to secure the adjusting strap on the hook portion.

9. The mounting bracket as claimed in claim 8, wherein the mounting base is integrally formed with the connecting hook.

10. The mounting bracket as claimed in claim 3, wherein the first buckling portion comprises a first side buckle and a second side buckle twinned with the first side buckle to allow the adjusting strap to pass through, the second buckling portion comprises a pair of third side buckles to allow the adjusting strap to pass through.

* * * * *